United States Patent
Chou

(10) Patent No.: US 7,386,544 B2
(45) Date of Patent: Jun. 10, 2008

(54) DATABASE SEARCH SYSTEM

(75) Inventor: Peilin Chou, Taipei (TW)

(73) Assignee: Bridgewell Inc., Taipei (TW)

( * ) Notice: Subject to any disclaimer, the term of this patent is extended or adjusted under 35 U.S.C. 154(b) by 417 days.

(21) Appl. No.: 11/036,483

(22) Filed: Jan. 13, 2005

(65) Prior Publication Data

US 2006/0155688 A1    Jul. 13, 2006

(51) Int. Cl.
*G06F 7/00* (2006.01)
(52) U.S. Cl. .............................. 707/5; 707/3
(58) Field of Classification Search ............ 707/5, 707/3, 101, 102
See application file for complete search history.

(56) References Cited

U.S. PATENT DOCUMENTS

2004/0213458 A1* 10/2004 Kanatsu ..................... 382/181
2005/0086226 A1*  4/2005 Krachman .................... 707/6

* cited by examiner

Primary Examiner—Wilson Lee
Assistant Examiner—Angela M Lie
(74) Attorney, Agent, or Firm—Venable LLP; Raymond J. Ho

(57) ABSTRACT

The present invention discloses a database search system comprising:
- a composite database search engine, comprising at least two database search tools wherein at least one is database search agent;
- a database search agent establishing and training module to automatically generate a database search agent according to analysis of a data file and to automatically modify content of said database search agent according to content of another database search agent; each database search agent comprising a series of search indices and their weight values; and
- user interface to allow user to actuate any of said database search tools to input evaluation of searched data files to be desired or not;
- wherein said database search agent establishing and training module modifies database search agent according to content of searched data files determined to be desired by user.

3 Claims, 4 Drawing Sheets

DATABASE SEARCH SYSTEM

FIELD OF THE INVENTION

The present invention relates to a database search system, especially to a database search system that automatically generates database search agents according search results using a variety of search tools and modifies or trains the generated search agents to search desired data files according to particular user's personal evaluations. Database search agents are thus made portable from one computer to another.

BACKGROUND OF THE INVENTION

Along with the computerization and the internetization of human life, many kinds of information are already digitized and stored in all kinds of databases. The internet links these digitized databases to form a huge large-sized database. The result of such development is the difficulty for users to search "desired" data files in this large-sized database. Searching in the internet has become the daily routine suffer of most people.

In order to allow users to search for desired data files in the internet, there are many search engines or search tools having been developed. Among them, the most popular ones are those conducted following the "full text searching" policy. The full text searching policy allows users to establish search conditions including "keywords" and operands such as "and", "nand" and "or" between them to form searching parameters. These parameters are then compared with the content of every data file in the database, whereby data files with contents complying or similar to the searching parameters are selected as results of search.

Another popular searching approach is to allow users to input a paragraph of text to function as searching conditions. The search tool automatically allocates "keywords" in the paragraph and generates a series of search parameters according to the content and combinations of these keywords in the paragraph. Thereby, searches of related data files may be conducted using the obtained searching parameters.

The above and other searching tools can only provide one-time search functions. When the user wishes to search again for the same topic, inputting the same searching parameters will be necessary. In fact as the search parameters are not complicated, keeping the searching parameters for further use is not very valuable.

U.S. patent application Ser. No. 10/794,698 discloses a method for establishing a series of searching parameters by analyzing the content of a data file. The method automatically analyzes the content of a data file, such as an article, to obtain a series of searching parameters. The series searching parameter is repeatedly trained by the user until it is mature enough to search desired data files according to user's personal evaluations. The series of searching parameter forms a database search agent that may be reused by the same or different users.

U.S. patent application "portable database search agent processing system" which filing number will be provided later discloses a portable search agent. The portable search agent may be used in the above Ser. No. 10/794,698 invention. The search agent is portable so that the user may transplant it to another computer to be modified by another or by the same user in that other computer, whereby the modified search agent may be used to search desired data files for another search purpose.

It is thus necessary to provide an integrated database search system that is able to integrate a variety of database search tools allowing users to selectively use.

It is also necessary to provide a novel database search system that allows users to establish particular search agents for repeated use.

It is also necessary to provide an integrated database search system that allows users to establish database search agents using a variety of search tools.

It is also necessary to provide a database search system that allows users to establish and to train database search agents using a variety of search tools.

OBJECTIVES OF THE INVENTION

The objective of this invention is to provide an integrated database search system that is able to integrate a variety of database search tools allowing users to selectively use.

Another objective of this invention is to provide a novel database search system that allows users to establish particular search agents for repeated use.

Another objective of this invention is to provide an integrated database search system that allows users to establish database search agents using a variety of search tools.

Another objective of this invention is to provide a database search system that allows users to establish and to train database search agents using a variety of search tools

SUMMARY OF THE INVENTION

According to this invention, a novel database search system is provided. The database search system of this invention comprises:

a composite database search engine, comprising at least two database search tools, each using at least one type of database search condition as bases for searching in a database data files complying with said search condition;

a database search agent establishing and training module to automatically establish a database search agent according to analysis of a data file and to automatically modify content of said database search agent according to content of another database search agent; wherein said database search agent contains a series of search parameters, each parameter comprising at least one search condition and its weight value; and a user interface to allow user to actuate any of said at least two database search tools and any function provided by said database search agent establishing and training module and to display results of searches using said at least two database search tools;

wherein at least one of said at least two database search tools uses database search agent to search data files in said database and wherein said database search agent establishing and training module establishes a database search agent according to analysis of a certain number of data files determined to be desired according to personal evaluation of user.

The above and other objectives and advantages of this invention may be clearly understood from the detailed description by referring to the following drawings.

DETAILED DESCRIPTION OF THE INVENTION

The embodiments of the database search system of this invention will be described as illustration in the followings. The present invention discloses an integrated database search system, in which a variety of data search tools is integrated into its search engine. The user may select any one or more of them to conduct desired searches in a database, such as the internet. Data files obtained in the search may be used to establish or to modify a database search agent. The database search agent will mature into a skillful search agent after repeated training.

Figure 1:
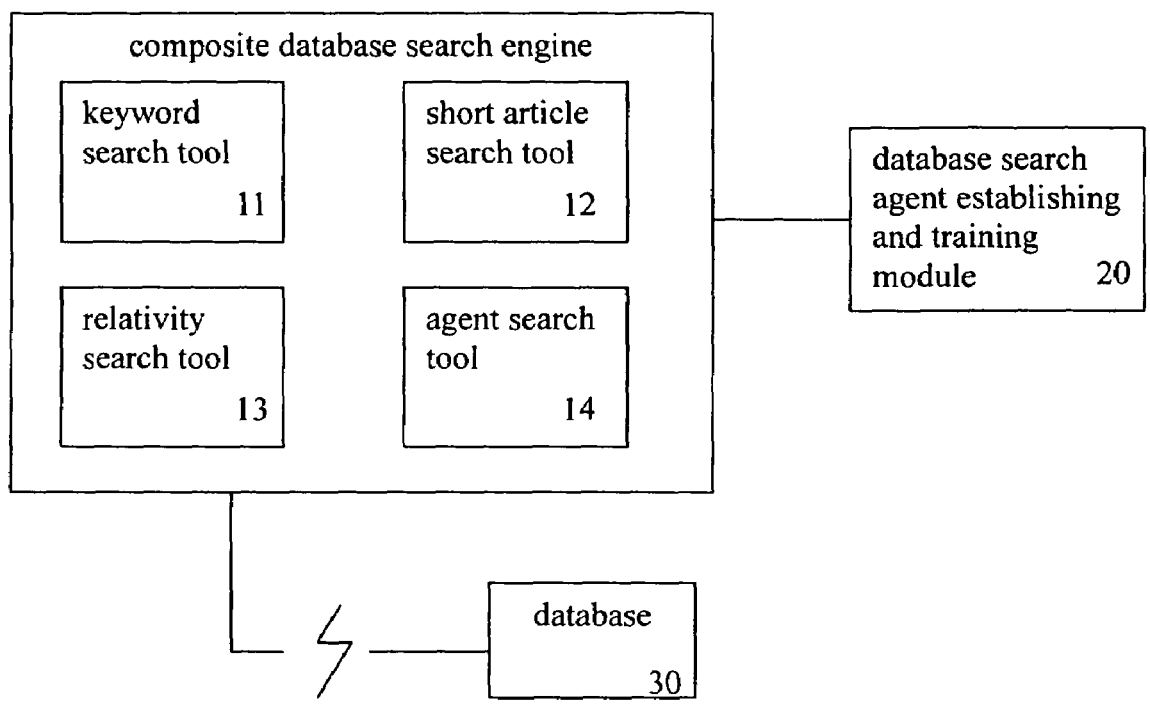
FIG. 1 shows the systematic diagram of the database search system of this invention.

FIG. 1 shows the systematic diagram of the database search system of this invention. As shown in this figure, the database search system of this invention comprises in general a composite database search engine 10 and a database search agent establishing and training module 20.

The composite database search engine 10 comprises a plurality of database search tools 11, 12 and 13. In the embodiments of this invention, search tools that may be used in the composite database search engine 10 include any applicable search tool, such as a keyword search tool 11 that uses a group of keywords and operands such as "and", "nand", "or" etc. between or among then, to search in database 30 data files that contain such keywords with specified logic relations; a short article search tool 12 that allows users to input a paragraph of article and analyzes the input article to generate a series of keywords and the logic relations between or among them, to be used as conditions in searching desired articles in the database 30, a similarity search tool 13 that allows the input of a data file and analyzes content of the input data file to generate a database search agent, so to search data files that comply with the search conditions specified by the search agent in the database 30; an agent search tool 14 that uses a database search agent to search data files that comply with search conditions specified by the search agent in the database 30, and any search tools that may use particular means to search desired data files in the database 30.

In the present invention, a database search agent may be expressed by the following equation:

$$Si=(x_{i1}, w_{i1}), (x_{i2}, w_{i2}), \ldots, (x_{in}, w_{in})$$

wherein x represents a search index; for text files as data files to be searched, x may be a keyword; for image files, x may be a pattern; for voice files, x may be a waveform or any other pattern; w represents weight value of indices x.

In the present invention, the database search agent may be an imported search agent or a locally generated search agent. The search agent may be generated by any known art. For example, U.S. patent application Ser. No. 10/688,295 disclosed a technology wherein a series of search indices are manually generated from a search keyword.

U.S. patent application Ser. No. 10/794,698 disclosed a technology that is able to automatically generate a series of search indices from results of analyzing on the content of one or more data files.

The method of generating an applicable database search agent will be described by taking the search agent of said U.S. patent application Ser. No. 10/794,698 as an example. In the following description, only the case of generating a database search agent for searching text files will be described. Those skilled in the art may recognize that similar approaches may be applied to generate search agents if the files to be search are not text files.

Figure 2:
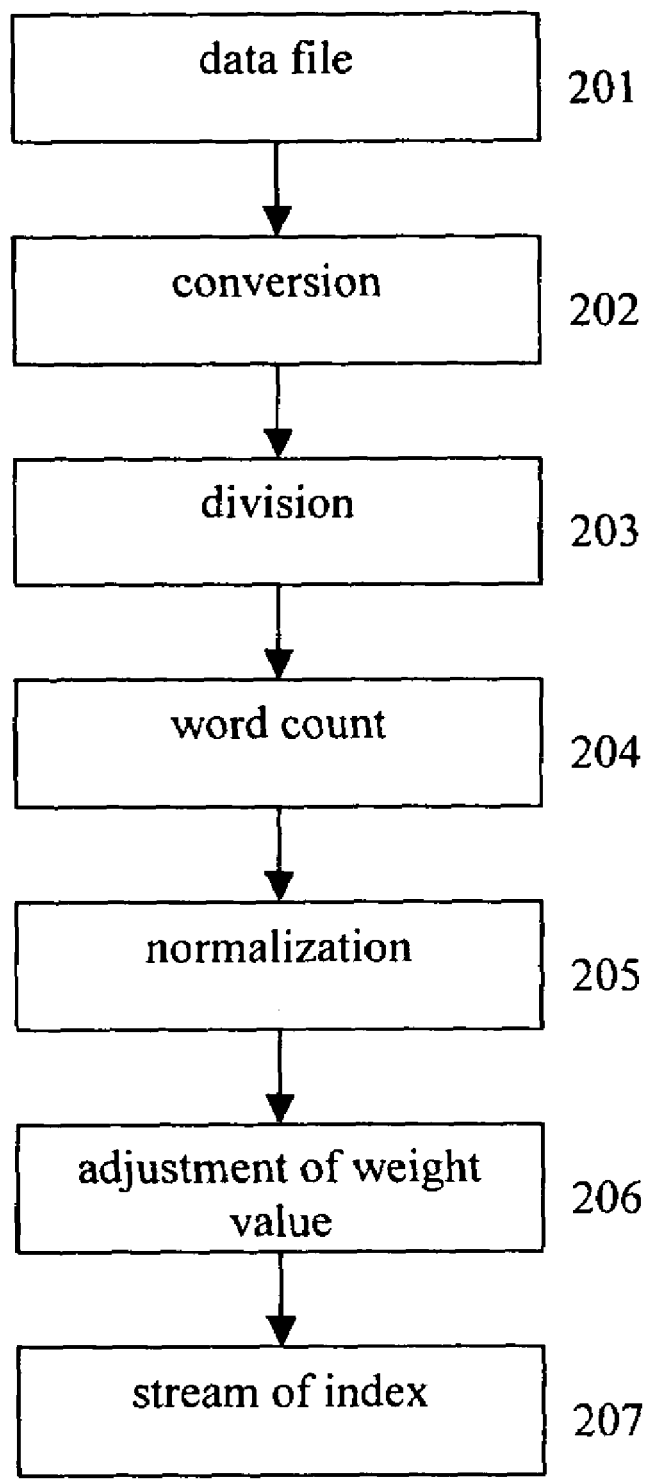
FIG. 2 shows the flowchart of the method for generating a database search agent from a text file, as used in this invention.

FIG. 2 shows the flowchart of the method for generating a database search agent hat may be used to search data files other than text files. As shown in this figure, at 201 a data file is obtained as reference, which data file is a text file. At 202 the text file is converted into a particular file format, such as the text format, to facilitate the processing. At 203 the characters or letters of the text file are divided into words so to obtain a file of a continuous string of words. At 204 the number of existence of each word in the file is calculated so to obtain a file containing a string of words and their respective frequency values (number of existence in the file). The string of words and their frequency values may be called as an index string. Then at 205 the index string is normalized to reduce influences brought to the indices and their weight values by the length of the word string. In the actual application of this invention, a standard length of word string may be determined as basis and all weight values are divided by the ratio of length of the corresponding word string to the standard length so that the weight values are normalized.

At 206 adjustments are made to words with high weight values but with no index values. In doing so, words that would appear in most articles are considered of no index values and their weight values are reduced. An adjustment factor may be determined so that in the more articles a word appears the less its weight value is given. After the adjustments, all weight values and their corresponding words (indices) are recorded at 207 to form a database search agent. During the process, if the database search agent is generated from the result of analyzing a plurality of text files and positive indices which indicate "desired" searches and negative indices which indicate "not desired" searches are both included in the obtained search agent, the weight values for the positive keywords are positive values and for the negative keywords are negative values.

After a database search agent is generated, articles having been analyzed in the previous process are collected as sample data files. The samples preferably include a plurality of "desired" articles and a plurality of "not desired" articles. Indications showing desired or else are attached to these sample articles. In selecting the sample articles, articles with higher absolute values of similarity values (to be described in details hereinafter) may be selected.

Besides the above approach, other method that may help to generate database search agents with similar mechanism may also be used in this invention.

The composite search engine 10 may obtain data file A in the database 30 and compare content of the data file A with the search agent. After the comparison, matched indices (e.g., words) are labeled and Similarity Values of respective data files are calculated, as follows:

$$\text{Similarity}=\Sigma x_j w_j, \forall x_j \in (A)$$

wherein A represents data files being searched, (A) represents cell consisted of data or words contained in data file A, $x_j$ represents indices contained in the database search agent and $w_j$, their respectively their corresponding weights.

The composite search engine 10 compares the Similarity values with a threshold value and selects those data files with Similarity values greater or equal to the threshold value as results of the search.

In one embodiment of this invention, the keyword searching tool 11 is able to automatically generate, based on the group of keywords input by the user, a database search agent representing the "concept" indicated by the group of input keywords. Such "conceptual" database search agent may be generated manually or using a particular method. U.S. patent application Ser. No. 10/688,295 "Conceptual Article Collector" disclosed one of such particular method and may be taken for reference in this invention. In this U.S. patent application, any method to convert a search keyword into a database search agent may be used to generate the database search agent.

In addition, the short article search tool 12 provides the function of automated generation of database search agent from a short article input by the user. As to how such database search agent is generated, reference may be made to the above-mentioned U.S. patent application Ser. No. 10/794,698. Similarly, the relativity search tool 13 may use a similar method to generate a database search agent to search related data files in the database.

When a user uses the composite database search engine 10 to search, the user may select at least one of the provided search tools to search desired data files in the designated databases. The database may be the hard disc drive or optical disc drive of a computer system, an intranet, the internet or any networked database.

Figure 3:
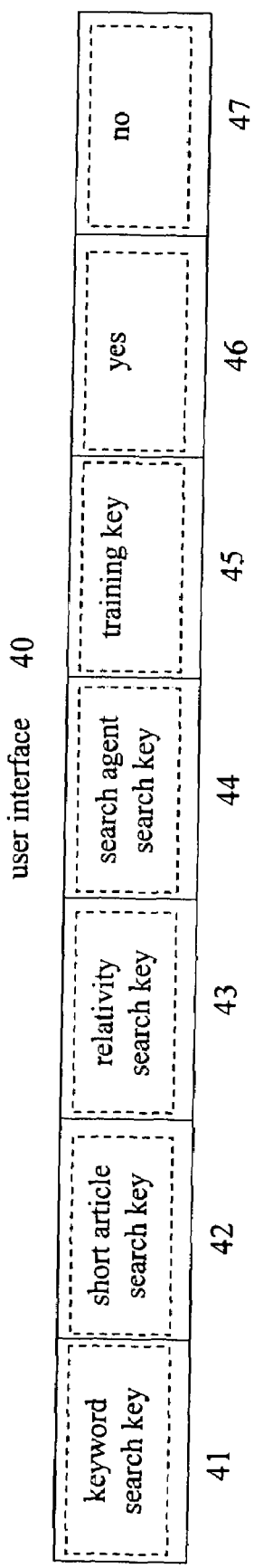
FIG. 3 shows the operation interface of the database search system of this invention.

FIG. 3 shows the user interface of the database search system of this invention. As shown in this figure, the user interface 40 of the database search system of this invention comprises: a keyword search key 41, a short article search key 42, a relativity search key 43 and a search agent search key 44. The user interface may further comprise a training key 45 and a positive evaluation key 46 and a negative evaluation key 47. When the user clicks any search key using a mouse pointing to that key and selects a database to be searched, data files with features complying with the search conditions may be obtained. If the search agent is imported from external, the user will have to install the imported search agent in the system.

In general, data files obtained from the above step are only "related" to what the user wishes to search. This is partially because the search tools, including the search engine, are not especially designed for particular users. To solve this problem, a training tool is provided in the present invention. The database search agent establishing and training module 20 does not only establish database search agents using substantially the method described above, it also modifies an established database search agent, so to ensure that data files search by the search agent are "desired" data files according to the personal evaluation of the user.

To be more specific, functions of the database search agent establishing and training module 20 include:

Establishing database search agents according to keywords, short articles and/or content of data files, in the manners as described above;

Establishing database search agents using an imported search agent; and

Modifying the content of a database search agent in order to satisfy the need of particular user.

In the embodiment of this invention, the database search agent establishing and training module 20 modifies a database search agent based on a reference database search agent, which is established according to content of a group of data files that is obtained from previous searches using at least one search tool provided by the composite database search agent 10. As a result, the user may use a database search agent or other search tools to conduct a reference search and use the resulted data files to modify the database search agent, such that the database search agent may provide even correct (desired) search results.

In a U.S. patent application entitled "Portable Database Search Agent Processing System", assigned to the same assignee and filed on the same day as this invention, which series number will be provided upon availability, a method to train a database search agent is disclosed. This technology may be used in the present invention in the modification of the locally generated or imported database search agent and is taken for reference in this application. In the followings, the database search agent training method as disclosed in the above-mentioned patent application will be described. Of course, any other method that may modify an established database search agent to search desired data files may also be used in this invention.

In order to modify a database search agent to more closely satisfy the needs of the user, the database search agent establishing and training module 20 first displays representations of the resulted data files of the reference search in the user interface 40, allowing the user to input evaluations. The user then reads the content of the reference search results to evaluate whether respective data files are "desired". In the application of this invention, a button may be provided to allow the user to key in "yes" or "no" to express his/her evaluations. In the embodiment of FIG. 3, a positive evaluation key 46 and a negative evaluation key 47 are provided. The user input "yes" or "positive" to evaluate a desired data file and "no" or "negative" to evaluate else. Of course, other methods of evaluation may also be used in this invention.

A data file having been evaluated is labeled with the evaluation. When a certain number of data files have been evaluated, or when the user stops the evaluation process, the database search agent establishing and training module 20 generates a series of indices to describe the group of evaluated data files, using, for example, the method described in FIG. 2. The series of indices is then used to modify the series of indices of the reference database search agent by including the former into the latter. If a group of sample data files is attached to the reference database search agent when it is imported, the evaluated data files are added in that group of model data files as a part thereof. The modified database search agent is represented by the following formula:

$$St = (x_{t1}, w_{t1}), (x_{t2}, w_{t2}), \ldots, (x_{tm}, w_{tm})$$

wherein x and w have the same definitions as above.

In the above step, indices of data files as evaluated as negative may have a negative weight value. A database search agent containing positive and negative weight values may be obtained.

In the actual application, if the modified database search agent is generated from the evaluated data files and the original model data files, the modified database search agent will contain a large number of indices that are identical to that of the imported database search agent. This is because the imported database search agent might be a search agent having been used and trained by others repeatedly.

The database search agent establishing and training module 20 uses the modified database search agent to search the combined group of model data files. Tests are automatically conducted to verify whether the modified database search agent is able to conduct correct searches, taking the labels of evaluation attached to the model data files into consideration. If the modified database search agent is able to identify the "positive" and "negative" model files, i.e., if result of such tests reaches relatively high accuracy, the modified database search agent is considered correct. Otherwise, evaluation by the user will be requested again.

When the modified database search agent is considered correct, it is combined with the imported database search agent Si, to obtain a test database search agent Ss. The test database search agent may be expressed by:

$$Ss=\{(x_{sk}, w_{sk})\}$$

wherein $x_{sk}=x_i$, $w_{sk}=w_{ik}+acc \times w_{tk}$, $\forall x_i = x_t$, $x_{sk}=x_i$, $w_{sk}=w_i$, $\forall x_i \notin \{x_t\}$, $x_{sk}=x_t$, $w_{sk}=w_t$, $\forall x_t \notin \{x_t\}$, and $k \in N$.

Then the database search agent establishing and training module 20 again uses the test search agent to conduct a search in the group of model data files. The accuracy of the search is compared with a standard value. If the accuracy value has reached the standard value, the test search agent is deemed a qualified database search agent, which is able to search "desired" data files according to personal evaluations of particular users.

If otherwise the accuracy value does not reach the standard value, the database search agent establishing and training module 20 repeats the modification of the imported database search agent. The modification may be conducted in a manner where the weight values of the reference database search agent are multiplied by the resulted accuracy value or by the product of multiplication of all the resulted accuracy values and then combined with the imported database search agent. It is also possible to modify the indices of the reference database search agent or their weight values with another method. In addition, to modify the imported database search agent and the reference database search agent separately before they are combined is also feasible.

The modified database search agent is then tested and modified until its accuracy value is equal to or greater than the standard value, whereby a desired database search agent is thus obtained.

Figure 4:
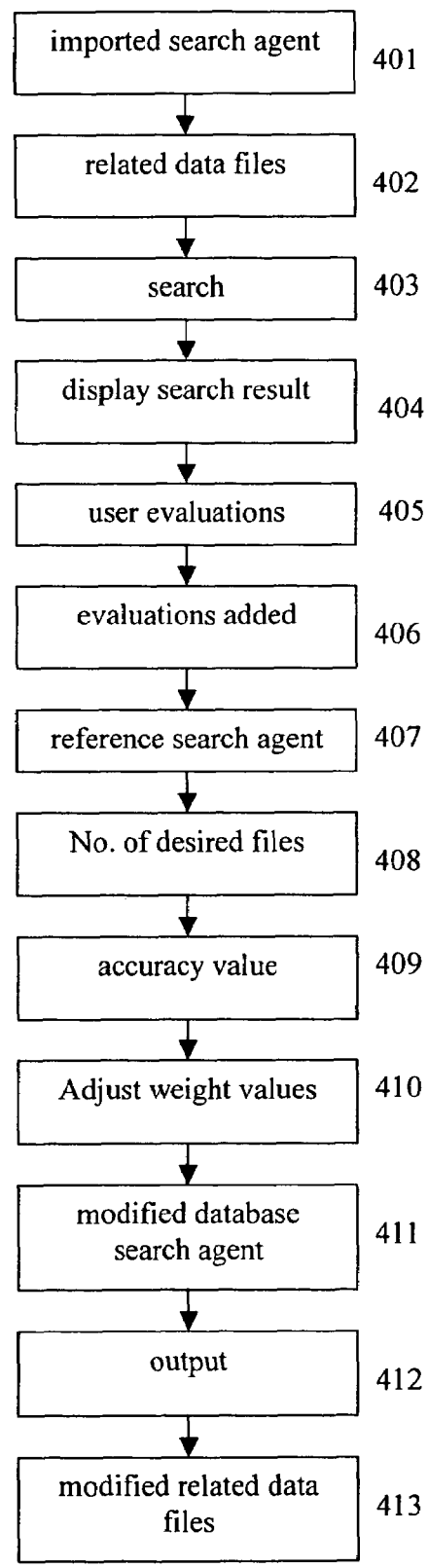
FIG. 4 shows the flowchart of the modification of a database search agent according to this invention.

To summarize the above description, the database search agent establishing and training module 20 of this invention modifies the imported database search agent with the following steps, referring to FIG. 4 which is flowchart of the method of modification of database search agent used in this invention.

As showing in FIG. 4, in order to modify an imported database search agent, at 401 a group of database search indices are found from the imported search agent. The group of indices includes a plurality of search indices and respectively corresponding weight values. At 402 a group of data file relating to said group of database search indices is obtained; said group of data file including a plurality of data files having been labeled with "desired" or "not desired" by the user.

At 403 the imported database search agent is used to search in a database to obtain a plurality of data files that satisfy the search conditions of said imported database search agent. At 404 a certain number of said obtained data files is selected and description thereof is displayed in a user interface. At 405 evaluations to said displayed data files are received; which evaluations include labels indicating whether a data file is desired or not. At 406 the evaluations are added into respective data files.

At 407 content of data files having been evaluated is analyzed to generate a reference database search agent; which reference database search agent comprises a group of database search indices and their respective corresponding weight values. At 408 determine, using said reference database search agent, a certain number of data files to be "desired" or "not desired" by user and calculate accuracy value of said reference database search agent at 409. At 410 the weight values in said reference database search agent are adjusted by reference to said accuracy value. At 411 said imported database search agent and said adjusted reference database search agent are combined to generate a modified database search agent. At 412 the modified database search agent is output as database search agent to be generated. Finally, at 413 said group of evaluated data files and said groups are combined to generate a modified related group of data files.

As described above, the database search system of this invention is able to integrate a variety of database search tools into one system, such that users may conduct search of data files to generate a database search agent to serve correct searches in all kinds of databases. The generated database search agent may be trained or modified from time to time, such that results of search using the trained search agent will satisfy the needs of particular user. The modification may be made to an imported search agent or to a search agent generated from a search process at any time.

As the present invention has been shown and described with reference to preferred embodiments thereof, those skilled in the art will recognize that the above and other changes may be made therein without departing from the spirit and scope of the invention.

What is claimed is:

1. A database search system stored on a computer, comprising:

a composite database search engine, comprising at least two database search tools including: keyword search tool, short article search tool, data file similarity search tool and database search agent tool, each database search tool providing at least one format of database search conditions, enabling said database search engine to search in a database data files satisfying search conditions under said format;

a database search agent establishing and training module to analyze content of a group of data file to generate a database search agent and to modify said generated database search agent according to another database search agent;

wherein said database search agent is recorded a group search indices and their respective corresponding weight values; and a user interface to provide a group of actuation means allowing user to actuate any of said at least two database search tools and any function of said database search agent establishing and training module and to display search results;

wherein said at least two database search tools include a database search tool to search data file using a database search agent;

wherein said database search agent establishing and training module establishes database search agent according to content of particular number of data files obtained from searching in database using any of said at least two database search tools;

wherein said database search agent establishing and training module modifies content of a database search agent according to evaluation on a plurality of particular data files being searched regarding whether a data file is desired or else; and wherein said database search agent establishing and training module modifies content of a database search agent $S_i=\{(x_{ik}, w_{ik})\}$ according to content of another database search agent $S_t=\{(x_{tk}, w_{tk})\}$ to generate a modified database search agent Ss, in the following manner:

$$Ss=\{(x_{sk}, w_{sk})\}$$

wherein $x_{sk}=x_i,\ w_{sk}=w_{ik}+acc \times w_{tk},\ \forall x_i=x_t,$ $x_{sk}=x_i,\ w_{sk}=w_i,\ \forall x_i \notin \{x_t\},$ $x_{sk}=x_t,\ w_{sk}=w_t,\ \forall x_t \notin \{x_i\},$ and $k \in N;$ x represents search indices, w represents corresponding weight values of such indices, acc represents accuracy, calculated according to said evaluation regarding whether a data file is desired or else, of search result of said another database search agent in a group consisted of particular data files.

2. The database search system according to claim 1, wherein said database search agent is expressed as:

$$Si=(x_{i1}, w_{i1}), (x_{i2}, w_{i2}), \ldots, (x_{in}, w_{in})$$

wherein Si represents the ith search agent, x is its search condition and w is weight of said search condition.

3. The database search system according to claim 1, wherein said user interface provides actuating keys for search tools including: keyword search tool, short article search tool, data file similarity search tool and database search agent, and actuating keys for establishing database search agent, for modification of database search agent and for user to input evaluation indicating particular data files to be "desired" or not.

* * * * *